United States Patent [19]

Peppiatt

[11] Patent Number: 4,915,892
[45] Date of Patent: Apr. 10, 1990

[54] MAKING SEALING RING ASSEMBLY

[75] Inventor: Nicholas A. Peppiatt, Lightwater, Surrey, England

[73] Assignee: Hallite Holdings Limited, England

[21] Appl. No.: 937,915

[22] Filed: Dec. 4, 1986

[30] Foreign Application Priority Data

Dec. 16, 1985 [GB] United Kingdom ............... 8530895
Jan. 24, 1986 [GB] United Kingdom ............... 8601723

[51] Int. Cl.$^4$ ............................................. B29C 45/14
[52] U.S. Cl. ................................. 264/138; 264/152; 264/250; 264/274; 264/275
[58] Field of Search ............... 264/255, 274, 275, 268, 264/247, 138, 152, 250

[56] References Cited

U.S. PATENT DOCUMENTS 3,578,812  5/1971  Taussig et al. ................. 264/263
3,851,888 12/1974  Limpson, Jr. et al. ........... 277/206
4,269,802  5/1981  Linne ........................... 264/255

FOREIGN PATENT DOCUMENTS 407354  7/1967  Australia .
0054369  6/1982  European Pat. Off. .

Primary Examiner—Jan H. Silbaugh
Assistant Examiner—Allan R. Kuhns
Attorney, Agent, or Firm—Larson and Taylor

[57] ABSTRACT

A sealing ring assembly suitable for a gland or piston seal is provided wherein a preformed resilient insert, preferably an elastomeric ring, is positioned in a ring mould, for example, by having a channel fitted over an annular projection of the mould, so as to partly define the moulding cavity of the mould. A sealing ring portion to be energized by the insert is then moulded onto the insert in the moulding cavity so that, in the assembly, the insert is mechanically retained and a perfect fit in a channel of the sealing ring portion, thereby avoiding the need to have the two parts bonded together. The insert and sealing ring portion may be slit e.g. to facilitate fitting of the assembly.

6 Claims, 2 Drawing Sheets

MAKING SEALING RING ASSEMBLY

FIELD OF THE INVENTION

This invention relates to sealing ring assemblies of a type used to provide a fluid seal between relatively axially movable parts, e.g. in gland and piston seals. In this type of assembly a sealing lip is generally provided on a sealing ring portion moulded from a hard-wearing thermoplastic material, and it is known to energize the seal in use by compression of a resilient insert at least part of which is in a channel or cavity running around the sealing ring portion.

BACKGROUND OF THE INVENTION

In one known method of making such an assembly the sealing ring portion and insert are produced separately by moulding or extrusion. The insert is then fitted into the channel or cavity of the sealing ring portion where it is retained mechanically. However this method does not generally produce a very good match between channel and insert because small differences and inconsistencies in size and/or shape of the two parts tend to arise in manufacture. As a result there is a variation in contact and surface reaction over the opposing insert and channel surfaces in the assembly, and this in turn causes undesirable variation in effectiveness of seals as they age and/or the pressure on them is increased.

A second known method which in part avoids the problems described above involves moulding the insert using the channel of the sealing ring portion. The sealing ring portion is preformed with a channel of the desired shape by injection moulding, and then itself used as part of a mould in which the insert is subsequently formed. Such a method does however have certain drawbacks. The insert is necessarily moulded and not extruded which may be uneconomical in certain cases. More importantly, chemical bonding is needed between the two parts to hold the insert in position. With this method it is not generally possible to use the most effective insert materials with very low compression set because the high temperature thermosetting conditions for these would damage the thermoplastics sealing ring portion in which they were moulded.

In order to achieve the required chemical bonding it may be necessary to add an extra step to the production process. Because the surface to be treated is a concave channel surface, this extra step tends to be inconvenient, costly and a substantial disincentive to use of this method despite the other advantages of the method.

It is thus desirable to produce assemblies with a low compression set insert and a good and consistent fit between the parts, without having to carry out an inconvenient bonding step.

SUMMARY OF THE INVENTION

In the invention a sealing ring assembly is made by having the insert formed first, positioning it in a mould so that it partly defines a moulding cavity of the mould, and then moulding the sealing ring portion onto it in that mould cavity.

In this way use may be made of low compression set insert materials which are highly effective as seal energizers, for example elastomers such as nitrile rubber. The fit between the insert and the sealing ring portion need not be adversely affected by e.g. a high compression set of the insert material so that chemical bonding is obviated; mechanical retention by e.g. inwardly projecting flanges of the sealing ring channel will normally suffice to keep the insert accurately in place. Nevertheless the insert may be bonded to the channel if particularly secure contact is desired, the corresponding chemical treatment step being simplified by the insert surface to be treated being generally convex.

In another aspect the invention provides a sealing ring assembly, capable of being made by a method as described above, having a sealing ring portion with a channel in which an insert more resilient than the sealing ring portion, and preferably of an elastomer such as nitrile rubber, is retained only mechanically and wherein due to the sealing ring portion having been moulded onto the insert there is a substantially perfect fit between insert and channel.

The sealing ring assembly may also have the insert and sealing ring portion split, with the splits being spaced apart in the assembly. This is particularly relevant for use in gland seals since it enables replacement on site by the simple removal of a retaining cap, tearing away of the old assembly and fitting of a new one by opening up the splits around the rod or shaft of the gland.

BRIEF DESCRIPTION OF THE DRAWINGS

By way of example preferred embodiments of the invention will now be described, with reference to the accompanying drawings in which.

DETAILED DESCRIPTION OF THE PREFERRED EMBODIMENTS

Figure 1:
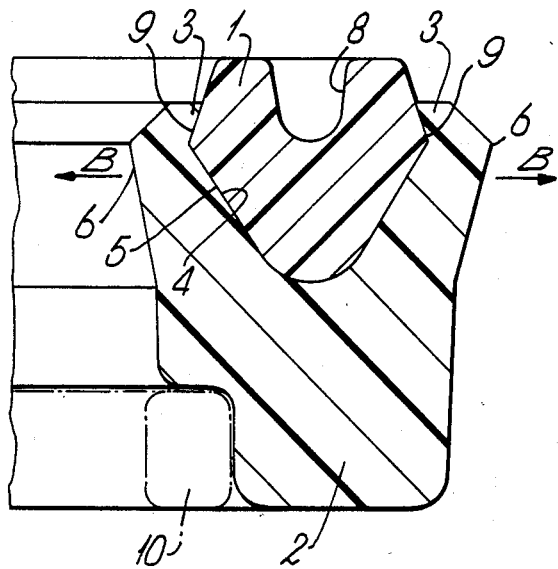
FIG. 1 is a radial section of part of a sealing ring assembly.
Figure 4:
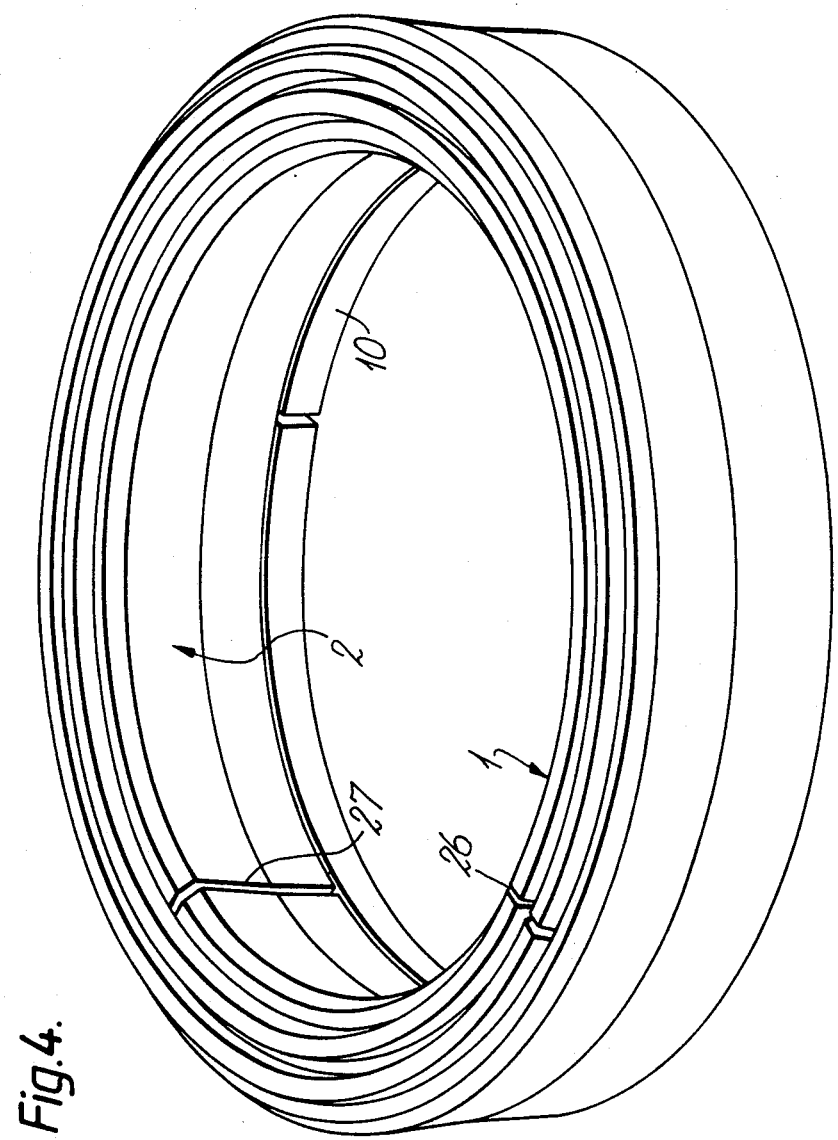
FIG. 4 is a three-quarter view of a sealing ring assembly.

Referring to FIGS. 1 and 4, a sealing ring assembly comprises a circular sealing ring portion 2 having a uniform cross-section approximating to a Y-shape, the outer parts of the two paired limbs of the Y forming radially inner and outer sealing lips 6 of the assembly. Between these limbs is defined a channel 5 of substantially V-section in which an energizing insert in the form of a closely-fitting ring 1 is retained mechanically by opposed inwardly-projecting flanges 3 at the ends of the limbs, which engage side ridges 9 of the insert 1. The insert 1 also has a substantially V-shaped cross-section with a continuous channel 8 in an otherwise substantially flat axial face projecting axially of the assembly somewhat beyond the Y-limbs of the sealing ring portion 2. The outer surface 4 of the insert 1 and the surface of the channel 5 in the portion 2 are in uniform contact over the whole of their areas. The material of the portion 2 is resilient but selected primarily for good wear properties and resistance to extrusion under pressure, while that of the insert 1 is selected to be more resilient, and have a lower compression set, than that of the portion 2. For example portion 2 would be of a tough thermoplastics elastomer such as polyurethane and insert 1 of a highly resilient thermosetting material such as nitrile rubber.

Figure 2:
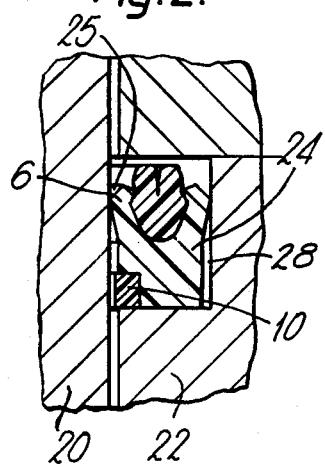
FIG. 2 is a fragmentary sectional view showing a gland seal.

Typical operation of the assembly is seen with reference to FIGS. 1 and 2. FIG. 2 shows part of a sealing situation, with a circular shaft 20 moving axially in the cylindrical bore of a gland 22. A gland seal comprises a ring assembly like that of FIG. 1, here designated generally 24, seated in a recess 28 of the bore and supported on its radially inner, sliding contact side by a hard plastics bearing-and-support ring 10 which itself fits in a rectangular recess of the sealing ring portion 2. The ring assembly, including the insert 1, is compressed radially between the shaft 20 and the side of the recess 28 so that the lips 6 form a seal 25. The compressed insert 1 fortifies ("energizes") the seal by urging the sealing lips 6 outwardly in the direction of arrows "B" in FIG. 1, its extra resilience compensating for any failure to recover of the portion 2.

Figure 3:
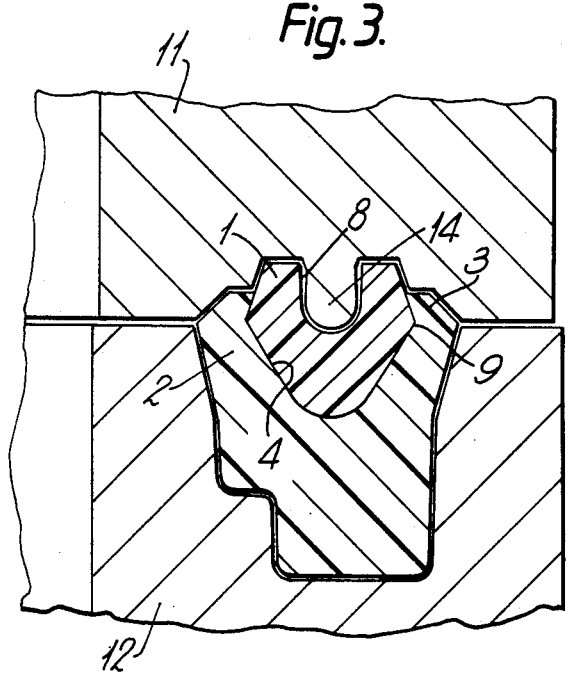
FIG. 3 is a sectional view showing moulding elements used to make an assembly as in FIG. 1.

With reference now also to FIG. 3, a sealing ring assembly is made by first moulding a nitrile rubber insert ring 1 having a cross-section as already described. The preformed insert ring 1 is then positioned in an upper mould part 11 of a sealing ring mould 11,12. Upper mould part 11 has a downward annular projection 14 over which the channel 8 of the insert 1 fits to hold the latter in place around the mould. Upper and lower mould parts 11,12 are then brought together so that a mould cavity of the appropriate Y-section sealing ring shape is defined by the two mould parts 11,12 and the convex outer surface 4 of the insert 1—in FIG. 3 the ring assembly and mould parts are shown slightly displaced from their functioning positions to make their boundaries more clear. Polyurethane compound is then injected into the moulding cavity and cured to form the sealing ring portion 2 of the assembly. Because the portion 2 is moulded onto the insert 1 a perfect fit between the two parts results. Moreover the upper mould part 11 and insert 1 are so shaped that the side ridges 9 of the insert 1 are included in the surface defining the mould cavity, whereby opposed flanges 3 are formed on the sealing ring portion 2 to retain the insert 1 mechanically in the finished assembly.

The insert need not be moulded, as described, but may be extruded instead; this may eliminate among other things the necessity for different insert moulds corresponding to different radii of sealing ring assembly.

We have found that, most surprisingly, sealing ring assemblies made in this way form very effective seals even when both the insert 1 and sealing ring portion 2 are split right through. This is of particular importance when they are used as gland seals since it enables replacement on site as already described. It also enables removal of a part of the ring assembly so that the seal may be adapted to fit a bore of smaller diameter.

The assembly is made as before and the ring portion 2 is then split by cutting through it radially. If the insert 1 was not already split then it is also split similarly. The insert and ring portion are then separated, fitted e.g. around the rod or shaft of a gland seal, and reassembled together but in such a way that the splits of the two portions are spaced away from one another by at least a distance equal to the axial depth of the sealing ring portion. Conveniently they may be spaced by some easily ascertainable angle such as 90°. The split material of each portion is then supported by unsplit material in that region but belonging to the other portion, the potential leak path in the sealing ring portion being closed by the energizing effect of the adjacent parts of the insert.

The ring assembly as notionally reassembled is shown in FIG. 4, where a split 26 in the insert 1 is at about 90° from a split 27 in the sealing ring portion 2. Clearly this refinement of splitting both the rings and then assembling with the splits staggered is not available in those cases where the insert and ring portion are chemically bonded together, but as explained earlier the mechanical fit achieved by the present method is generally so good that bonding will not normally be desired or necessary.

It will be apparent that the method allows freedom in the choice of channel shape and is not restricted to the production of gland and piston sealing ring assemblies, and could moreover be of advantage wherever a sealing ring is energized by an elastomeric insert.

I claim:

1. A method of making a sealing ring assembly comprising a sealing lip-defining outer ring having an annular channel and an insert ring for energizing sealing by the outer ring, said method comprising the steps of:
   (a) preforming a said insert ring comprising a thermosetting elastomeric material more resilient than the material of the outer ring;
   (b) positioning the preformed insert ring in a ring mould in a position such that a projecting outer surface portion of the insert ring partly defines a moulding cavity of said mould and so that portions of the ring moulding cavity define limbs which extend around the projecting outer surface of the insert ring on opposite sides thereof, said positioning comprising disposing a channel in the insert ring over a location projection extending around said ring mould to thereby hold the insert ring in position;
   (c) injecting a curable material for forming a said outer ring into the ring moulding cavity, onto the projecting outer surface portion of the insert ring and filling said portions defining said limbs; and
   (d) curing the injected material to thereby form a said tough elastomeric outer ring including a sealing lip and having, in cross-section, two limbs, formed by said portions of the moulding cavity, defining between them a said annular channel in the outer member, said annular channel extending sufficiently far around the insert ring to retain the insert ring mechanically in the channel.

2. A method as recited in claim 1 wherein the insert ring is formed of nitrile rubber.

3. A method as recited in claim 1 wherein the outer ring is formed of thermoplastic material.

4. A method as recited in claim 3 wherein the outer ring is formed of polyurethane.

5. A method as recited in claim 1 wherein step (b) includes fitting a channel of said insert ring over an annular projection of said mould to retain the insert in position in the mould.

6. A method as recited in claim 1 further comprising:
   (e) after moulding, splitting through the outer ring and the insert ring, and
   (f) repositioning the outer ring and insert ring relative to one another so as to space apart their respective splits in the assembly.

* * * * *